(12) United States Patent
Dai

(10) Patent No.: US 11,178,672 B2
(45) Date of Patent: Nov. 16, 2021

(54) DEVICES AND METHODS FOR PRIORITY FREQUENCY BAND DERIVATION IN WIRELESS COMMUNICATIONS

(71) Applicant: Intel Corporation, Santa Clara, CA (US)

(72) Inventor: Yucheng Dai, Beijing (CN)

(73) Assignee: Intel Corporation, Miami, FL (US)

(*) Notice: Subject to any disclaimer, the term of this patent is extended or adjusted under 35 U.S.C. 154(b) by 35 days.

(21) Appl. No.: 16/499,880

(22) PCT Filed: May 2, 2017

(86) PCT No.: PCT/CN2017/082702
§ 371 (c)(1),
(2) Date: Oct. 1, 2019

(87) PCT Pub. No.: WO2018/201275
PCT Pub. Date: Nov. 8, 2018

(65) Prior Publication Data
US 2020/0112969 A1 Apr. 9, 2020

(51) Int. Cl.
*H04W 4/00* (2018.01)
*H04W 72/10* (2009.01)
(Continued)

(52) U.S. Cl.
CPC .............. *H04W 72/10* (2013.01); *H04W 4/06* (2013.01); *H04W 8/24* (2013.01); *H04W 24/10* (2013.01);
(Continued)

(58) Field of Classification Search
CPC ....... H04W 72/10; H04W 76/27; H04W 4/06; H04W 8/24; H04W 24/10; H04W 72/0453; H04W 88/06
(Continued)

(56) References Cited

U.S. PATENT DOCUMENTS 9,479,938 B2 * 10/2016 Gokturk ................ H04W 16/10
2011/0122801 A1 5/2011 Franklin et al.
(Continued)

FOREIGN PATENT DOCUMENTS

CN 105917693 A 8/2016
WO 2010029424 A1 3/2010

OTHER PUBLICATIONS

International Search Report based on Application No. PCT/CN2017/082702 (3 pages) dated Jan. 24, 2018 (for reference purpose only).
(Continued)

*Primary Examiner* — Chuong T Ho
(74) *Attorney, Agent, or Firm* — Viering, Jentschura & Partner mbB

(57) ABSTRACT

A method and device for determining one or more frequency bands to report to a network, including acquiring an information from the network, assembling a database, the database comprising a plurality of frequency bands derived from the information acquired from the network, creating a priority frequency band list using an extraction parameter, wherein the priority frequency band list consists of one or more frequency bands from the plurality of frequency bands in the database, and reporting the priority frequency band list to the network.

20 Claims, 16 Drawing Sheets

(51) Int. Cl.
  *H04W 76/27* (2018.01)
  *H04W 4/06* (2009.01)
  *H04W 8/24* (2009.01)
  *H04W 24/10* (2009.01)
  *H04W 72/04* (2009.01)

(52) U.S. Cl.
  CPC ....... *H04W 72/0453* (2013.01); *H04W 76/27* (2018.02)

(58) Field of Classification Search
  USPC .................................................. 370/329, 330
  See application file for complete search history.

(56) References Cited

U.S. PATENT DOCUMENTS

| | | | | |
|---|---|---|---|---|
| 2012/0207040 | A1* | 8/2012 | Comsa | H04W 72/1215 370/252 |
| 2012/0207121 | A1* | 8/2012 | Dalsgaard | H04L 5/001 370/329 |
| 2015/0163804 | A1* | 6/2015 | Karlsson | H04W 72/0446 370/330 |
| 2015/0173094 | A1 | 6/2015 | Vangala et al. | |
| 2015/0201337 | A1 | 7/2015 | Hwang et al. | |
| 2015/0257114 | A1* | 9/2015 | Sawada | H04W 48/16 370/350 |
| 2015/0264637 | A1 | 9/2015 | Zaus et al. | |
| 2016/0262053 | A1 | 9/2016 | Palm et al. | |
| 2016/0269944 | A1* | 9/2016 | Li | H04W 48/18 |
| 2017/0078865 | A1* | 3/2017 | Santhanam | H04L 5/003 |
| 2017/0223708 | A1* | 8/2017 | Jung | H04W 76/14 |
| 2018/0368034 | A1* | 12/2018 | Lin | H04W 72/042 |

OTHER PUBLICATIONS

3GPP Organizational Partners; "3rd Generation Partnership Project; Technical Specification Group Radio Access Network; Evolved Universal Terrestrial Radio Access (E-UTRA); Radio Resource Control (RRC); Protocol specification (Release 14)"; 721 pages; Apr. 2017; retrieved from http://www.3gpp.org.

3 GPP; "RAN2 agreed CRs on LTE Carrier Aggregation and Small Technical Enhancements and Improvements for Rel-10"; 2 pages; Jun. 2014; 3GPP TSG RAN Meeting #64, France.

3GPP Organizational Partners; "3rd Generation Partnership Project; Technical Specification Group Radio Access getwork; Radio Resource Control (RRC); Protocol specification (Release 13)"; 2270 pages; Mar. 2017; retrieved from http://www.3gpp.org.

European Search Report based on application No. 17908155.9 (20 pages) dated Oct. 29, 2020 (Reference Purpose Only).

3GPP TSG-RAN WG2 Meeting #97; "Corrections in UE capability reporting"; Feb. 13-17, 2017, version 14.1.0; 5 pages, Athens, Greece; retrieved on Nov. 19, 2020 from https://www.3gpp.org/DynaReport/TDocExMtg--R2-97--17054.htm.

* cited by examiner

200

1100

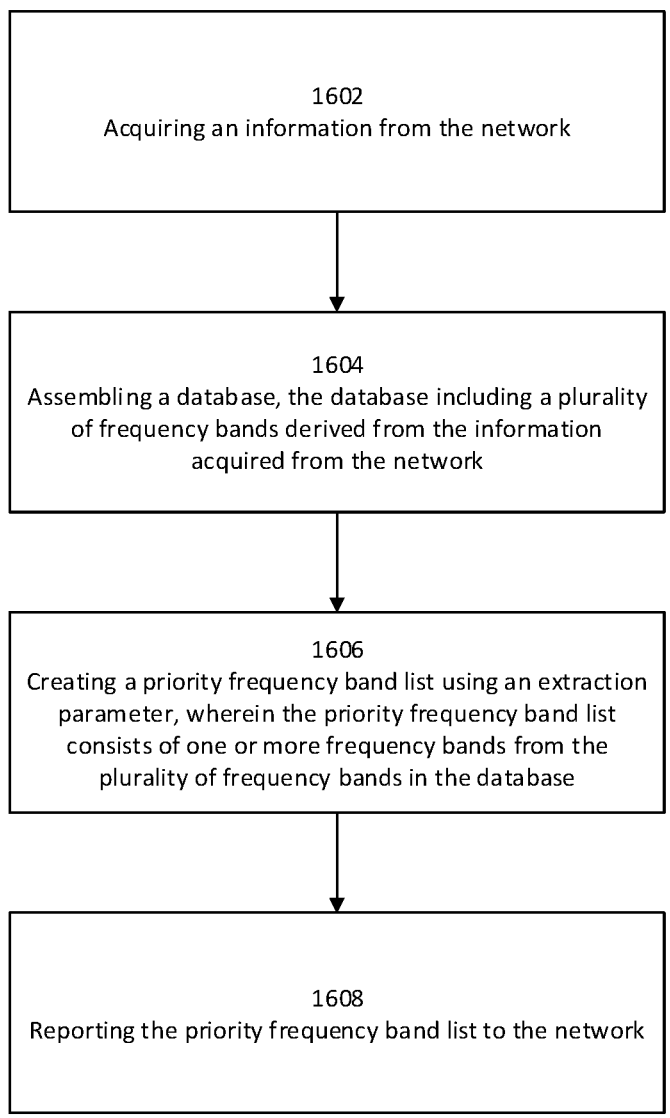

DEVICES AND METHODS FOR PRIORITY FREQUENCY BAND DERIVATION IN WIRELESS COMMUNICATIONS

CROSS-REFERENCE TO RELATED APPLICATIONS

[0] This application is a national stage entry according to 35 U.S.C. § 371 of PCT Application No. PCT/CN2017/082702 filed on May 2, 2017, which is incorporated herein by reference in its entirety.

TECHNICAL FIELD

Various aspects of this disclosure relate generally to a method and a device for wireless communications.

BACKGROUND

The improving power of mobile communication devices, e.g. user equipment (UE), has increased the number of frequency bands and band combinations that the devices are able to support. While this provides for more functional UEs in terms of connecting to a wider range of Radio Access Technology (RAT) frequencies, if the UE reports too many supported frequencies in response to a UE capability request from the network, the network will truncate the response message from the UE so that some of the network capability information is lost, which may result in radio link failure. As a result, a disruption in continuity of services may occur, degrading the user experience.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 16 shows a flowchart describing a method of this disclosure.

DESCRIPTION

Figure 1:
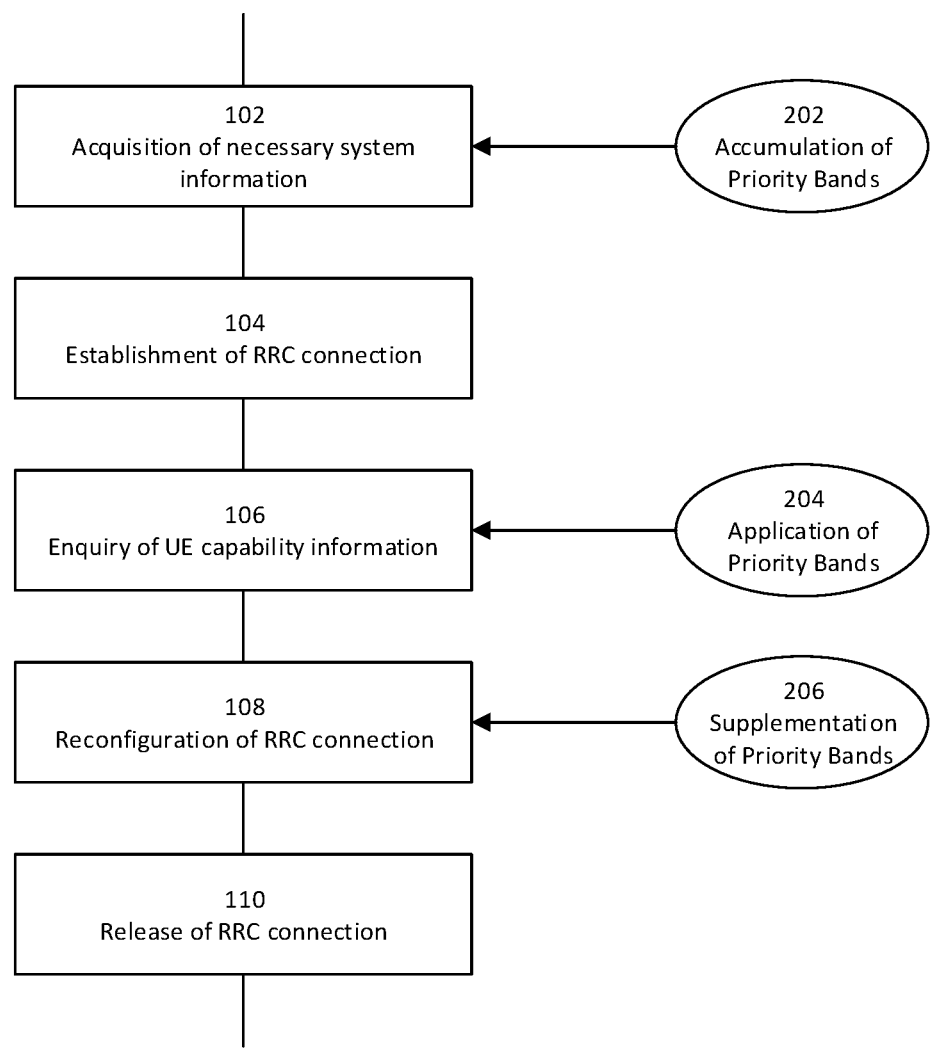
FIG. 1 is an overview of the methods and devices of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry" or "processer") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory." It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

The disclosure herein provides methods and devices to systematically reduce the UE supported frequency bands and frequency band combinations reported in uplink messages to a network, e.g. in Radio Resource Control (RRC) message "UECapabilityInformation" in Long Term Evolution (LTE) or in RRC Connection Setup Complete and UE Capability Information messages in Universal Terrestrial Radio Access Network (UTRAN). It has been observed in LTE network testing that the RRC connection reconfiguration procedure triggered by the network for handover does not take place if the UE reports too many supported frequency bands and band combinations in the RRC message "UECapabilityInformation," leading to radio link failure. This is attributed to the network truncating the capability information reported by the UE in the "UECapabilityInformation" message to its limitations so that some of the UE reported capability information is not received by the network, leading to a disruption in the continuity of services. However, if the UE reports fewer of the supported bands and band combinations, the length of the "UECapabilityInformation" message may be shortened and the RRC reconfiguration handover may be seamlessly performed.

The methods and devices of this disclosure make use of the information broadcast by the cell on which the UE is camped on to autonomously derive frequency bands and band combinations supported by the network and/or UE. When reporting to the network, the UE may therefore limit its response to include only these derived frequency bands and band combinations in order to reduce the length of UE capability information transmitted to and/or received by the network. The methods and algorithms implemented by the signal processing components of this disclosure are collectively referred to as Autonomous Priority Band/Band-combination Derivation (APBD).

For example, the LTE radio access network (RAN) broadcasts system information in System Information Blocks (SIBs) containing, among other things, "FreqBandIndicator," "multiBandInfoList," "interFreqCarrierFreqList," and transmits measurement configurations, i.e. "measConfig," which are received by the UE. APBD uses these information elements to derive frequency bands and band combinations supported by the network so that the length of the UE uplink capability messages may be reduced in order to achieve better service continuity, thereby improving user experience.

The Third Generation Partnership Project (3GPP) has introduced an optional feature called "Network requested Carrier Aggregation (CA) Band Combination Capability Signaling" (NRCAS) to limit UE reporting its supported frequency bands and band combinations, but this feature requires both the UE and the network to be upgraded to the latest corresponding version of the standard in order to support the feature. APBD provides a more flexible and compatible approach, and, also, may serve as a supplement to the currently specified solution while allowing UEs to work better in earlier network infrastructure versions than NRCAS. In a first scenario demonstrating APBD's greater compatibility than NRCAS, if the network does not support NRCAS and irrespective if the UE supports NRCAS or not, a UE configured to implement APBD may still provide the network with shorter and more reasonable frequency bands/band-combinations without introducing any negative side effects on the network. In a second scenario demonstrating APBD's greater compatibility than NRCAS, if both the UE and the network support NRCAS, an APBD-configured UE will still be able to provide more accurate frequency bands/band-combinations to the network.

APBD may be used in multiple modes, e.g. in both LTE mode and 3G mode. For a UE working in Evolved UTRAN (E-UTRAN) mode, i.e. LTE mode, the E-UTRAN enquires the UE about its capability. APBD uses the system information, including information broadcast by SIB 1, SIB 5, and/or SIB 15 and the measurement configuration (e.g. measConfig in the rrcConnectionReconfig message) to derive the supported bands and band combinations, allowing the UE to report the derived capability information to E-UTRAN. For a UE working in UTRAN mode, i.e. 3G mode, APBD may also use information broadcast by SIB 19 and/or Measurement Control to derive the supported bands and band combinations in order to set the derived capability information in the RRC Connection Setup Complete message and/or the UE Capability Information message.

FIG. 1 is diagram 100 illustrating an overview of the APBD methods of this disclosure. It is appreciated that diagram 100 is exemplary in nature and may therefore be simplified for purposes of this explanation.

In order to obtain service, the UE selects a cell to camp on and registers its presence with the network. With respect to the Access Stratum protocol stack, the UE performs the procedure depicted in 102-110 in order to comply with 3GPP specifications. In 102, the UE acquires the necessary system information through the SIBs broadcast from the network. In 104, the UE established the RRC connection upon registering with the network or initiating service. In 106, the E-UTRAN requests the UE to provide its capability information, e.g. in LTE, an evolved Node B (eNodeB, or eNB) sends the UE a UE Capability Enquiry downlink message. In 108, the network reconfigures the RRC connection, e.g. during inter-cell handover. In 110, the RRC connection is released upon termination of the registration process or service.

The features introduced by APBD are shown in 202-206. In 202, APBD accumulates and sorts frequency bands and/or band combinations according to priority. In 204, the accumulated and sorted frequency bands and/or band combinations are used to construct a priority band list. And in 206, the priority bands in the database may be supplemented (i.e. updated) in order to keep the UE up to date with network conditions.

Figure 2:
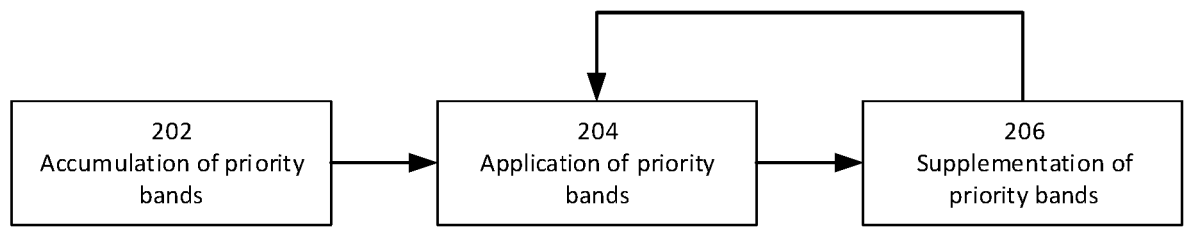
FIG. 2 is a method of frequency band reporting.

FIG. 2 is a flowchart 200 showing frequency band reporting according to APBD as implemented in this disclosure. Flowchart 200 shows 202-206 as they relate to each other in order to apply them in FIG. 1.

APBD implements a local database used for storing the priority frequency bands. The local database may initialize to invalid values and may include at least one of the following characteristics: it includes a cell identity and a list of frequency bands; it does not contain a duplicated frequency band in the list; it has a priority order, the first frequency band on the list being of the highest priority; it is cleared every time a cell is changed (e.g. during cell selection, cell re-selection, handover, etc.); it is cleared every time SIB 1 and/or SIB 5 are changed; and the number of stored priority frequency bands may be limited to a certain number, e.g. a number chosen such that the information sent in an uplink message to the network does not exceed the space allotted for such an uplink message.

Figure 3:
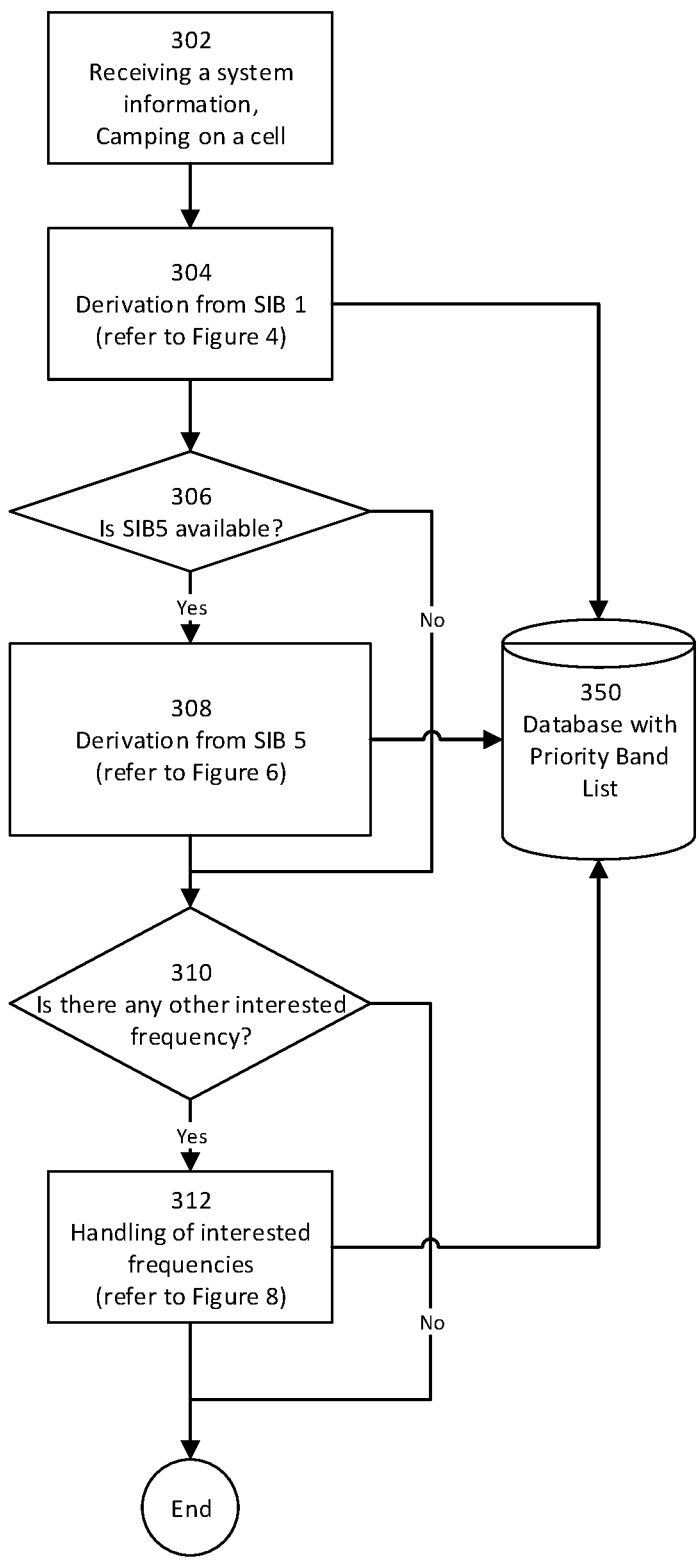
FIG. 3 is a flowchart showing an accumulation of priority bands in LTE.

FIG. 3 is a flowchart 300 illustrating accumulation of priority bands in an aspect of this disclosure. It is appreciated that flowchart 300 is exemplary in nature and may be simplified for purposes of this explanation. Flowchart 300 is an example when a UE is in E-UTRAN (i.e. LTE) mode, but it is appreciated that a similar process may be applied for the corresponding features in UTRAN (i.e. 3G) mode.

The accumulation of priority bands may be triggered upon camping on a cell and/or receiving a system information from the network 302. Priority bands may be derived from SIB 1 304, which contains mandatory information element (IE) "freqBandIndicator" and other optional IEs such as "multiBandInfoList," "freqBandIndicator-v9e0," "multiBandInfoList-v9e0," "freqBandIndicatorPriority-r12," etc., and added to the database with the priority band list 350. The derivation of priority bands from SIB 1 is shown in more detail in FIG. 4.

In addition to deriving priority bands from the information from SIB 1, e.g. from the "freqBandIndicator" and other IEs, APBD also derives priority bands from SIB 5 308 and adds these priority bands to the database 350. SIB 5 contains the mandatory IE "interFreqCarrierFreqList" and other optional IEs such as "interFreqCarrierFreqList-v8h0," "interFreqCarrierFreqList-v9e0," "interFreqCarrierFreqListExt-r12," etc., and APBD makes use of the frequencies from these IEs to derive priority bands to add to the database 350. The derivation of priority bands from SIB 5 is shown in more detail in FIG. 6.

Also, priority bands may be derived from other interested frequencies 312 if it is determined that they are available 310. An interested frequency may be, for example, a subscription service frequency, such as for evolved Multimedia Broadcast Multicast Service (eMBMS), a Closed Subscriber Group (CSG), etc. The handling of these interested frequencies is shown in more detail in FIG. 8.

If the UE is in UTRAN mode, it may also receive SIB 19 (not shown in FIG. 3). SIB contains IEs "eutra-FrequencyBandPriorityInfoList," "multipleEUTRAFrequencyBandIndicatorList," etc. Priority bands may be derived from these IEs and added to the database 350 as well. The derivation of frequencies from SIB 19 when the UE is shown in more detail in FIG. 9.

Figure 4:
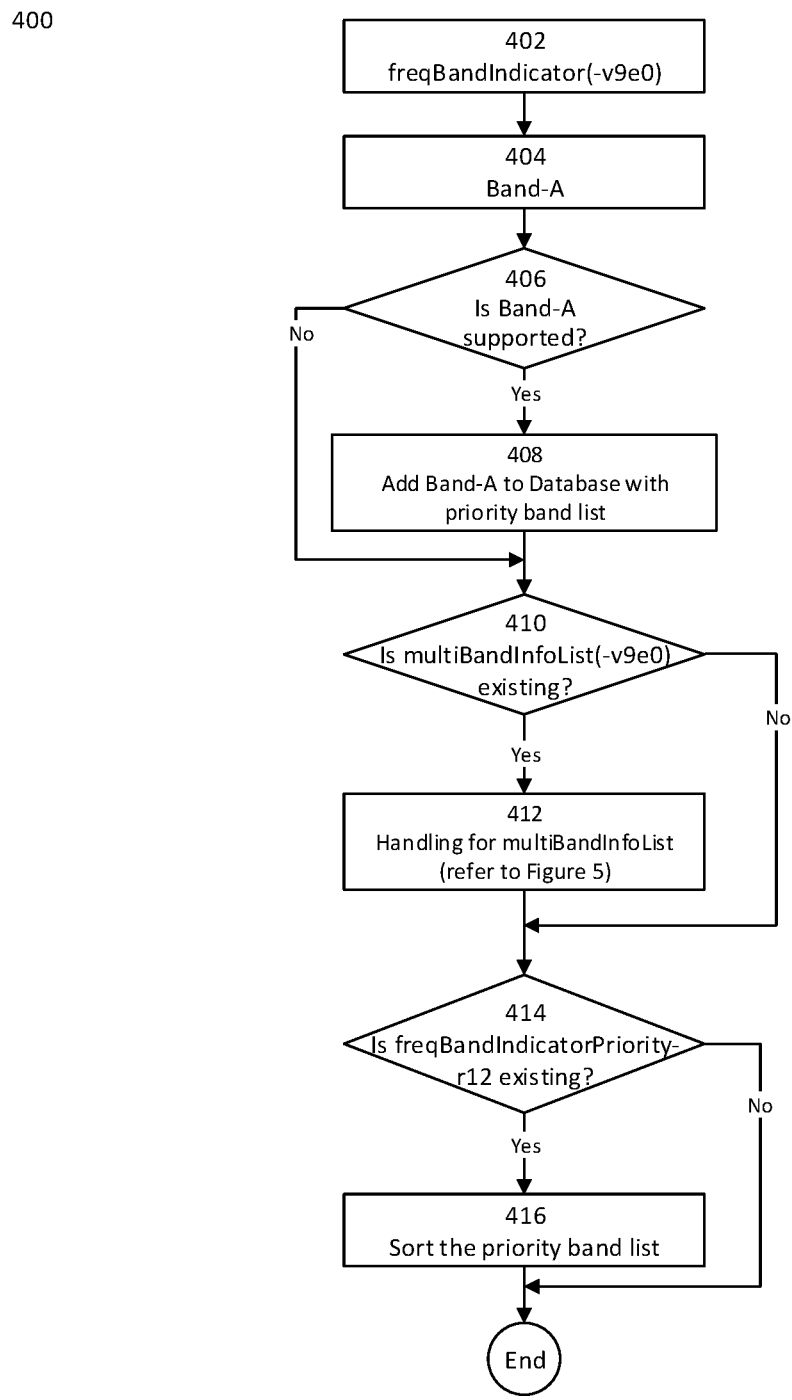
FIG. 4 is a flowchart showing derivation of frequency bands from SIB 1.

FIG. 4 shows a flowchart 400 describing the derivation of priority bands from SIB 1, corresponding to 304 in FIG. 4. It is appreciated that flowchart 400 is exemplary in nature and may be simplified for purposes of this explanation.

UE may receive IE "freqBandIndicator-v9e0" 402 in SIB 1 and use this IE to determine a first frequency band, e.g. Band-A, 404. If Band-A is supported by the UE, it is added to the database including the priority band list 408. If it is determined not to be supported by the UE 406, then it is not added. If the UE also receives "multiBandInfoList-v9e0" 410, it may derive further frequency bands 412, which is shown in more detail in FIG. 5. After finishing up acquiring frequency bands from SIB 1 and adding them to the database, the UE may determine whether the SIB 1 contains the "freqBandIndicator Priority-r12" IE 414 in order to sort the priority band list 416.

Figure 5:
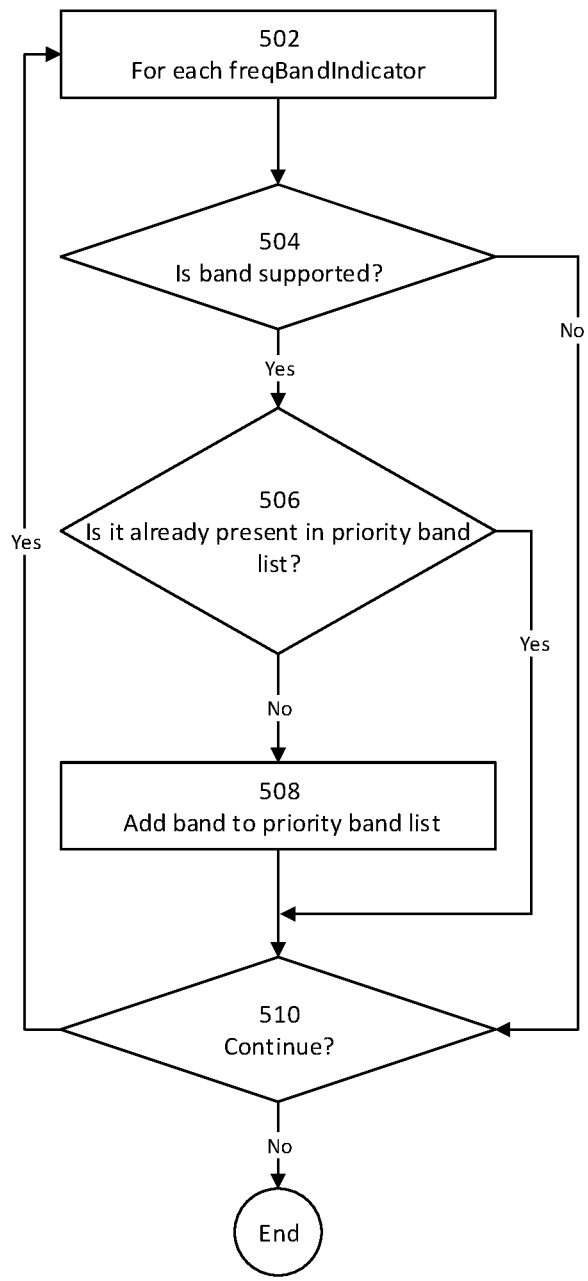
FIG. 5 is a flowchart showing the handling of multiBand-InfoList in SIB 1.

FIG. 5 shows a flowchart 500 for the handling of the multibandInfoList of SIB 1 corresponding to 412 in FIG. 4. It is appreciated that flowchart 500 is exemplary in nature and may be simplified for purposes of this explanation.

For each freqBandIndicator 502 on the multibandInfoList, the UE first determines if it supports the frequency band 504. If it does not, it moves on to the next freqBandIndicator until it has exhausted the list. If the frequency band is supported, the UE determined whether the band is already on the priority band list in the database, e.g. if it is the same as Band-A from FIG. 4. If it is, then the band does not need to be added to the database again (in this manner, duplicates are avoided in order to shorten the priority band list), but if it is not, then the frequency band is added to the priority band list 508 in the database. This is repeated until all the bands from the freqBandIndicator are processed 510.

Figure 6:
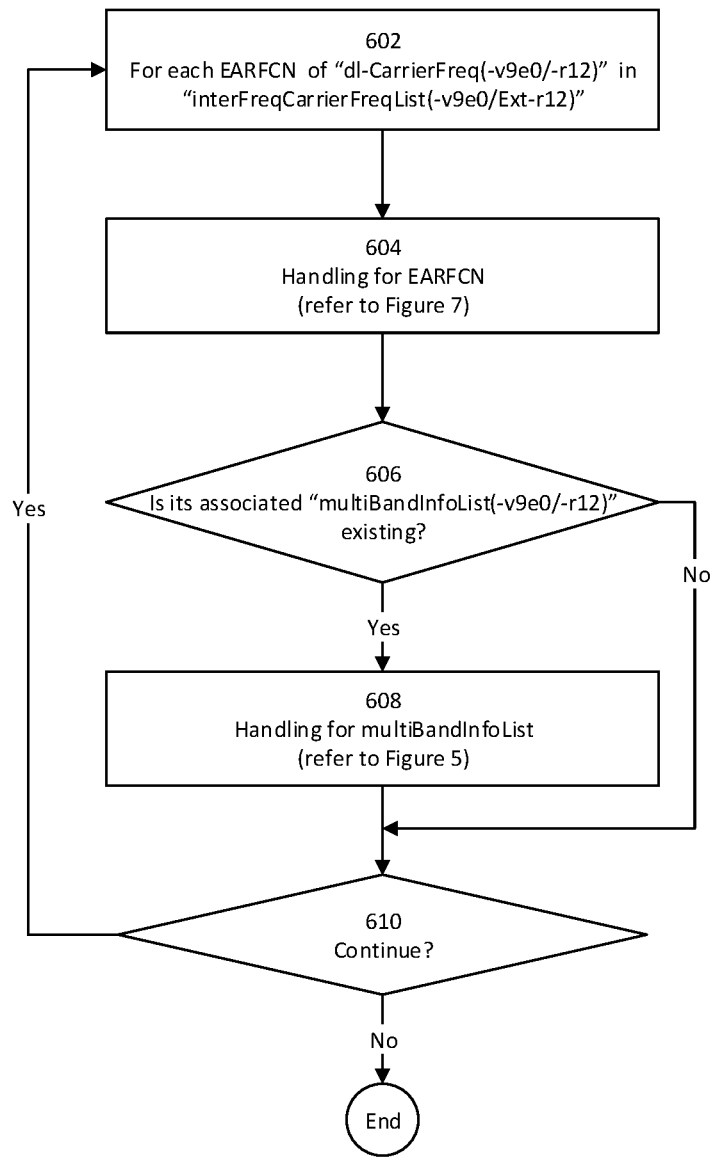
FIG. 6 is a flowchart showing derivation of frequency bands from SIB 5.

FIG. 6 shows a flowchart 600 illustrating the derivation of frequency bands from SIB 5 as shown in 308 in FIG. 3. It is appreciated that flowchart 600 is exemplary in nature and may be simplified for purposes of this explanation.

Figure 7:
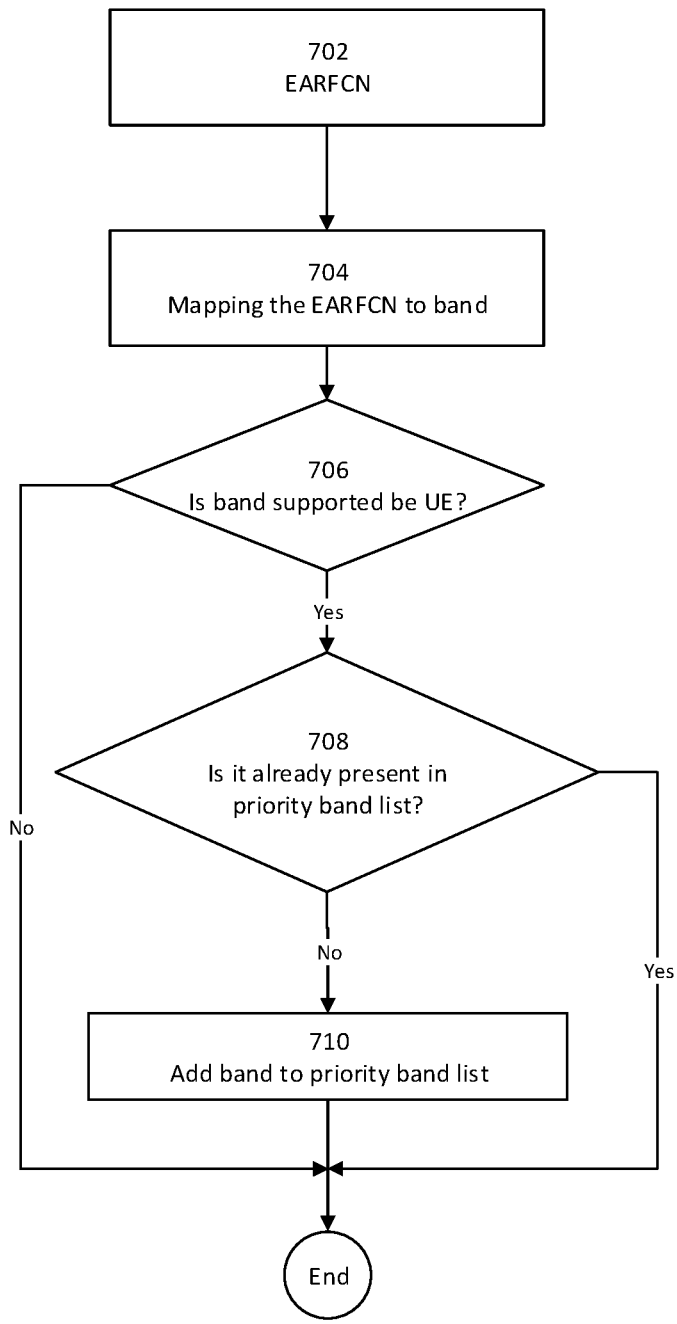
FIG. 7 is a flowchart showing the handling of Evolved Absolute Radio Frequency Channel Number (EARFCN)

For each Evolved Absolute Radio Frequency Channel Number (EARFCN) of "dl-CarrierFreq" in the "interFreqCarrierFreqList" IE, the UE performs the handling of each EARFCN 604, i.e. derives priority frequency bands from the IE, which can be seen in greater detail in FIG. 7. The UE may then determine whether SIBS contains the associated "multiBandInfoList" 606, and if it does, it handles the multiBandInfolist 608 in a manner similar to that shown in FIG. 5. Each EARFCN is processed in this manner until the EARFCNs are exhausted 610.

FIG. 7 shows a flowchart 700 illustrating the handling of each of the EARFCNs corresponding to 604 in FIG. 6. It is appreciated that flowchart 700 is exemplary in nature and may be simplified for purposes of this explanation.

For each EARFCN 702, the EARFCN is mapped to its frequency band 704. The UE then determines whether it supports this frequency band 706, and if it does, it determines whether the frequency band is already in the database containing the priority band list 708. If the band is not in the database, then the band is added 710.

Figure 8:
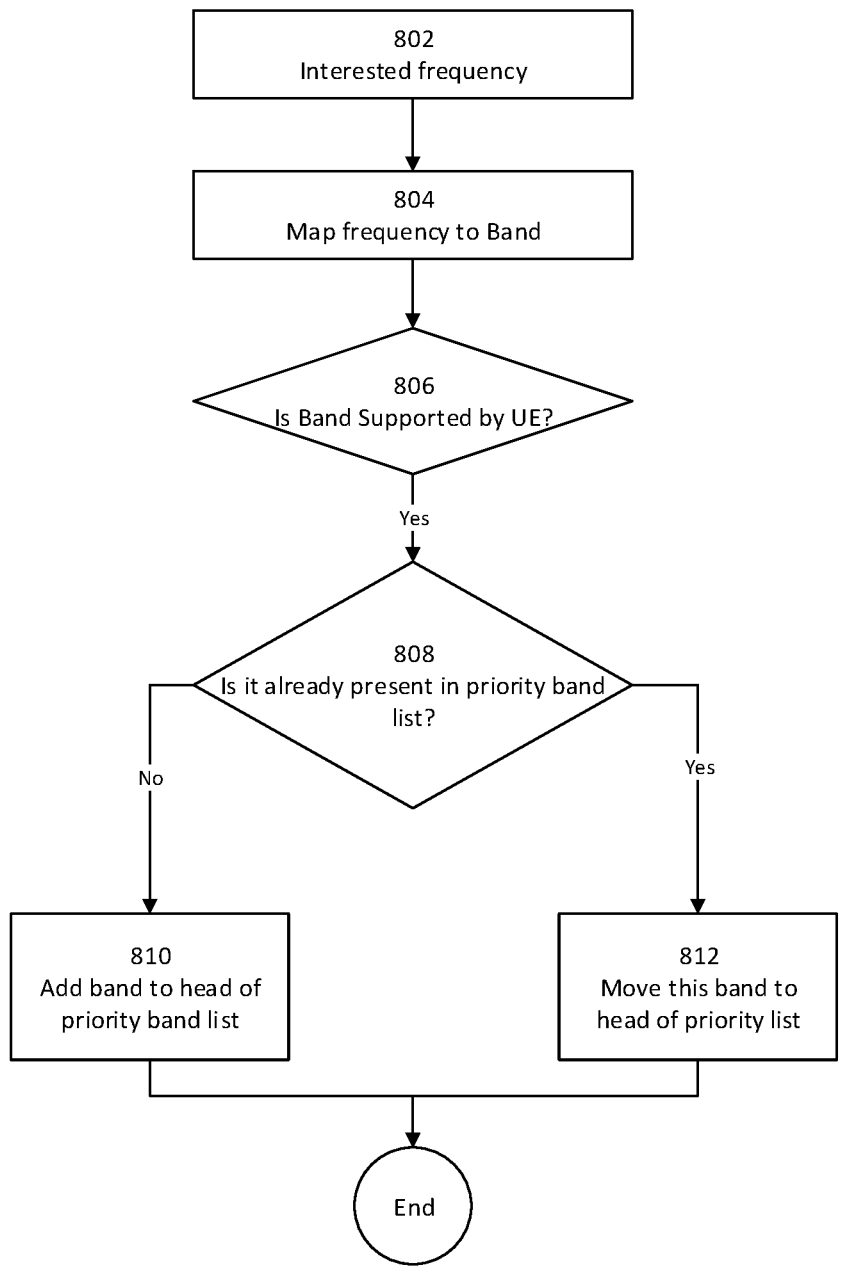
FIG. 8 is a flowchart showing the handling of other interested frequencies.

FIG. 8 shows a flowchart 800 illustrating the handling of interested frequencies as shown in 312 in FIG. 3. It is appreciated that flowchart 800 is exemplary in nature and may be simplified for purposes of this explanation.

As previously indicated, interested frequencies may, for example, include frequencies used to transmit MBMS, cell frequencies for CSG cells, etc. For each interested frequency 802, the frequency is first mapped to its respective band 804 so that the UE may determine whether it supports the respective band 806. If the respective band is supported by the UE, the UE determines whether it is already in the priority band list in the database 808. If it is not, then the respective band is added to the head (i.e. the front) of the priority band list 810. If the respective band is already on the list, i.e. the identical frequency band is already on the list, then it is moved to the head of the priority list 812, while the respective (or identical) frequency band is discarded so as to avoid duplicate bands of the same frequency.

Figure 9:
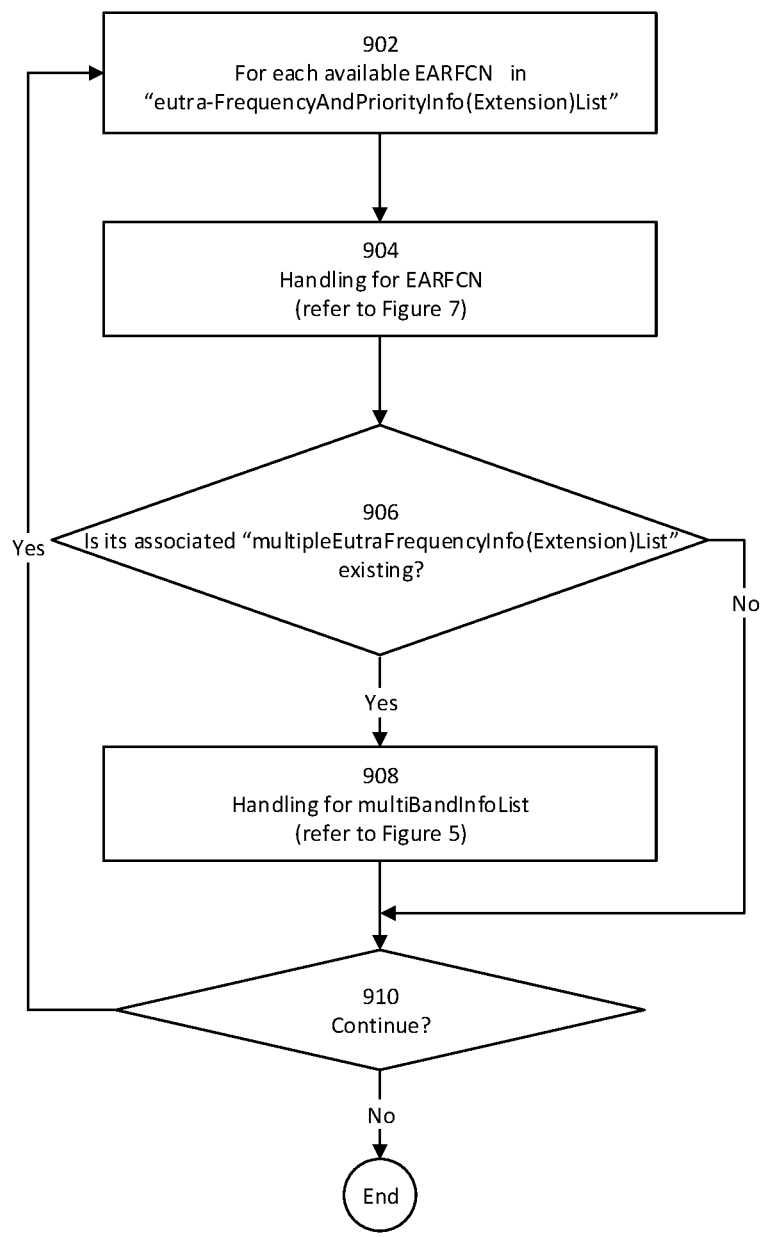
FIG. 9 is a flowchart showing derivation of frequency bands from SIB 19.

FIG. 9 is a flowchart 900 showing the derivation of bands from SIB 19 when the UE is in UTRAN mode. It is appreciated that flowchart 900 is exemplary in nature and may be simplified for purposes of this explanation.

For each available EARFCN in "eutra-FrequencyAndPriorityInfo(Extension)List" 902, the EARFCNs are handled 904 in the manner shown in FIG. 7. After the EARFCNs are handled, the UE determines whether it has received the associated "multipleEutraFrequencyInfo(Extension)List" 906, and if it has, it handles this list 908 in the manner shown in FIG. 5. The UE repeats this procedure until all of the bands of the EARFCNs acquired from SIB 19 are determined 910.

Figure 10:
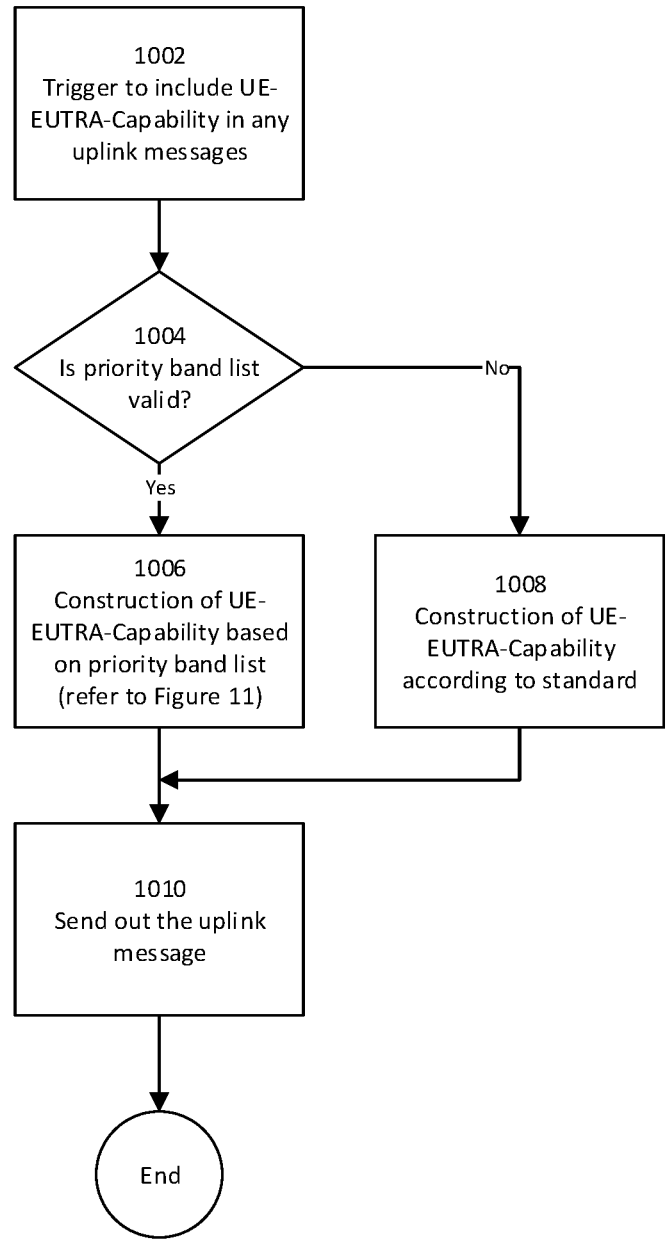
FIG. 10 is a flowchart showing the application of priority bands.

FIG. 10 is a flowchart 1000 showing the application of the assembled priority bands in forming the priority band list to send to the network. It is appreciated that flowchart 1000 is exemplary in nature and may therefore be simplified for purposes of this explanation.

A RAN, such as the LTE RAN or a 3G RAN, may trigger the UE to include UE-EUTRA (or UTRA) Capability in any uplink messages 1002. For example, this may be done when an eNB sends a UE Capability Enquiry to the UE (see FIG. 16). Upon being triggered, the UE may determine whether the priority band list stored on its database is valid 1004, and if it is, it may construct the response for the UE's capability (in either EUTRA or UTRA) based on the priority band list 1006. If the priority band list is no longer valid (e.g. UE has camped on a new cell and has not updated its priority band list yet), then the construction of the UE's capability may be done according to 3GPP standards 1008. In either case, once the UE's capability has bees been constructed, the uplink message is sent back to the network 1010.

Figure 11:
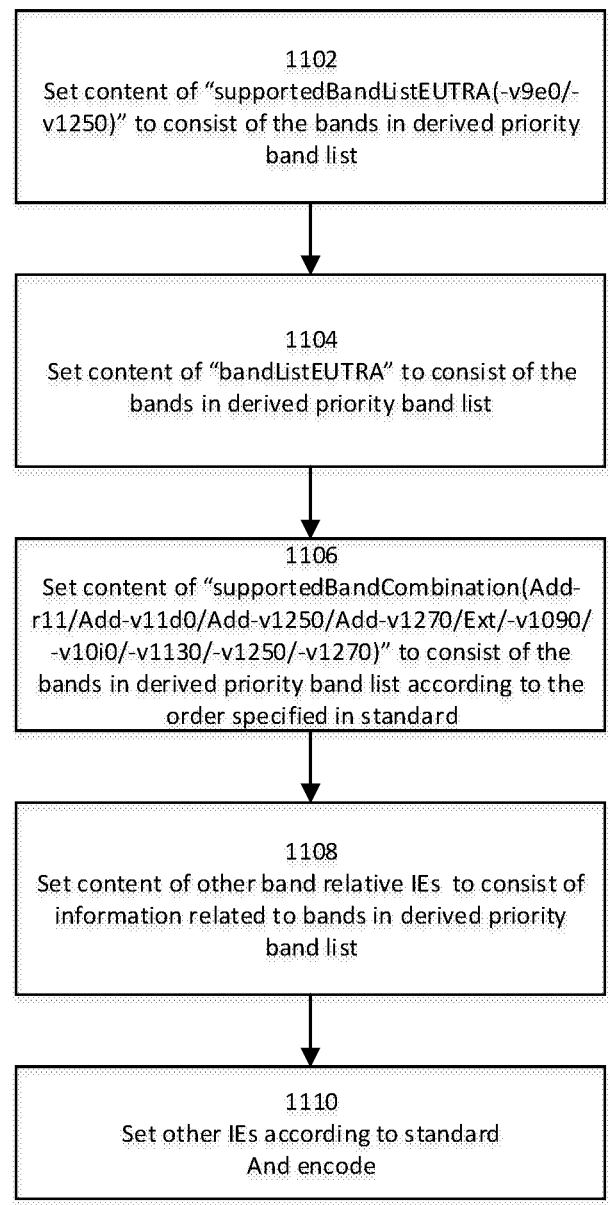
FIG. 11 is a flowchart showing the construction of UE-EUTRA-Capability based on the priority band list.

FIG. 11 is a flowchart 1100 showing the construction of a UE's EUTRA capabilities based on the priority band list of the database assembled in the manner shown in FIG. 3-9. It is appreciated that flowchart 1100 is exemplary in nature and may be simplified for purposes of this explanation. For example, flowchart 1100 is exemplary of the case where the UE is in E-UTRAN (i.e. LTE) mode, but it is appreciated that a similar process is applied for a UE in UTRAN (i.e. 3G) mode.

In 1102, the UE sets the content of "supportedBandListEUTRA(-v9e0/-v1250)" to consist of the bands in derived priority band list. In 1104, the UE sets the content of "bandListEUTRA" to consist of the bands in derived priority band list. In 1106, the UE sets the content of "supportedBandCombination(Add-r11/Add-v11d0/Add-v1250/Add-v1270/Ext/-v1090/-v10i0/-v1130/-v1250/-v1270)" to consist of the bands in derived priority band list according to the order specified in standard. In 1108, the UE sets the content of other band relative IEs to consist of information related to bands in the derived priority band list. In 1110, the UE sets the content of the other IEs according to the 3GPP standard and encodes the message for uplinking.

In a further aspect of this disclosure, the UE may be configured to set a limit to the number of frequency bands it reports back to the network in the uplink. Accordingly, flowchart 1100 may be used to implement the priority in which the UE's capability information is included in the report back to the network, where the frequency bands lower on the priority list may be omitted from the report sent to the network.

Figure 12:
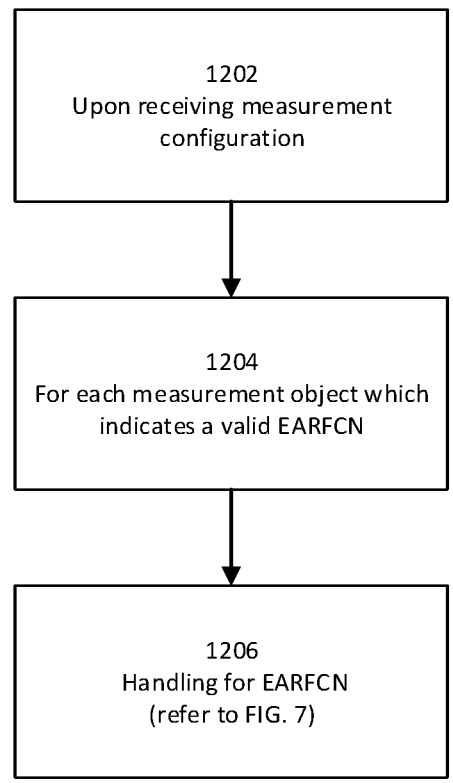
FIG. 12 is a flowchart showing the supplementation of the priority band list.

FIG. 12 is a flowchart 1200 showing the supplementation of priority bands. It is appreciated that that flowchart 1200 is exemplary in nature and may be simplified for purposes of this explanation. Furthermore, it appreciated that flowchart 1100 corresponds to the 206 in FIGS. 1 and 2.

Upon receiving a measurement configuration from the network 1202, e.g. during handover, the UE determines a measurement object which indicates a valid EARFCN 1204 and handles the EARFCNs 1206 in the manner shown in FIG. 7.

Figure 13:
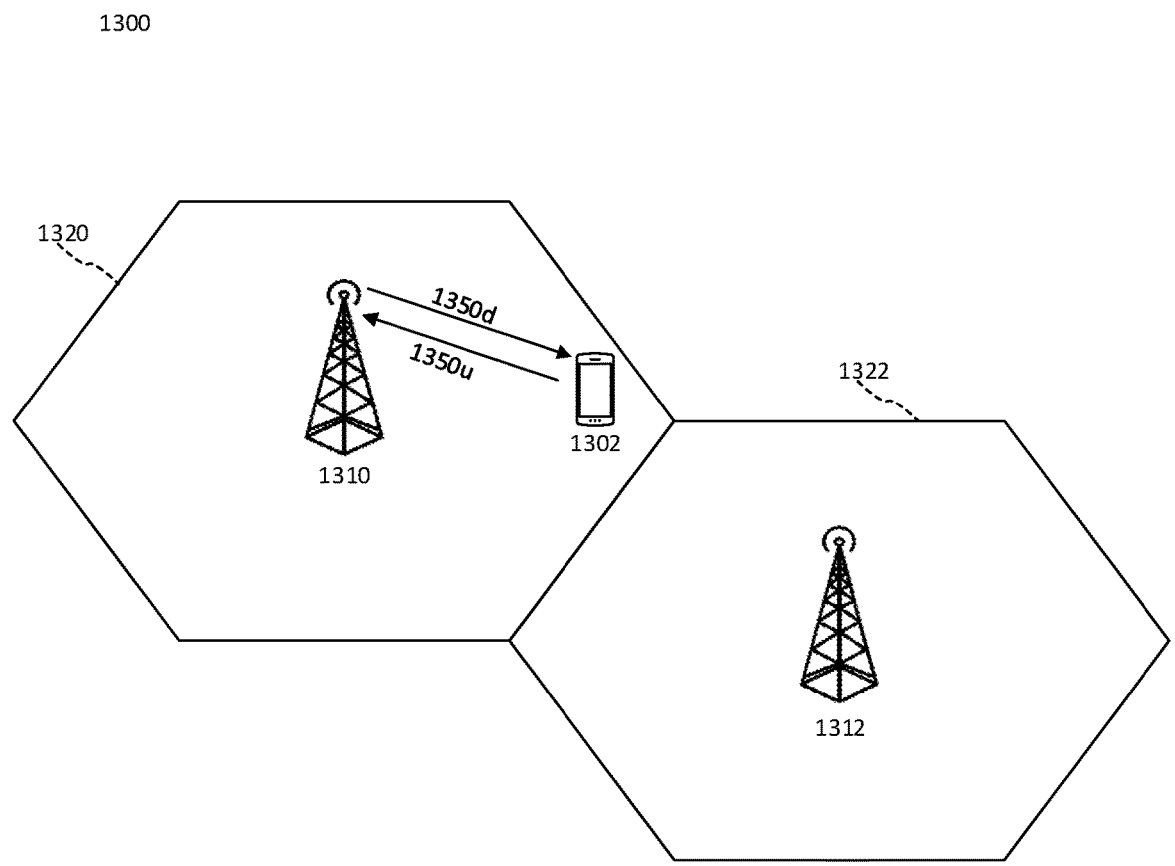
FIG. 13 shows a wireless communication network.

FIG. 13 shows a radio access network 1300 in an aspect of this disclosure. Network 1300 may be an LTE network including a UE 1302 and base stations 1310-1312. Base stations 1310-1312 may be LTE base stations (i.e. eNodeB, eNB) and may provide coverage to cell 1320 and 1322, respectively. Furthermore, cells 1320-1322 may be sectorized, i.e. composes of multiple LTE cells. Although shown as having explicit boundaries in network 1300, it is appreciated that cells 1320-1322 may have overlapping coverage with adjoining cells.

UE 1302 may exchange uplink 1350u and/or downlink 1350d data with base station 1310. For example, UE 1302 may be camped on cell 1320 via base station 1310. Furthermore, at least one of either UE 1302 or base station 1310 may be configured according to a Multiple Input Multiple Output (MIMO) scheme, in which the channel between the two may include a plurality of MIMO channels that each correspond to a unique path between a transmit antenna of base station 1310 and a receive antenna of UE 1302. Upon moving to cell 1322, the UE may be configured to perform APBD again in order to update its priority band list.

Figure 14:
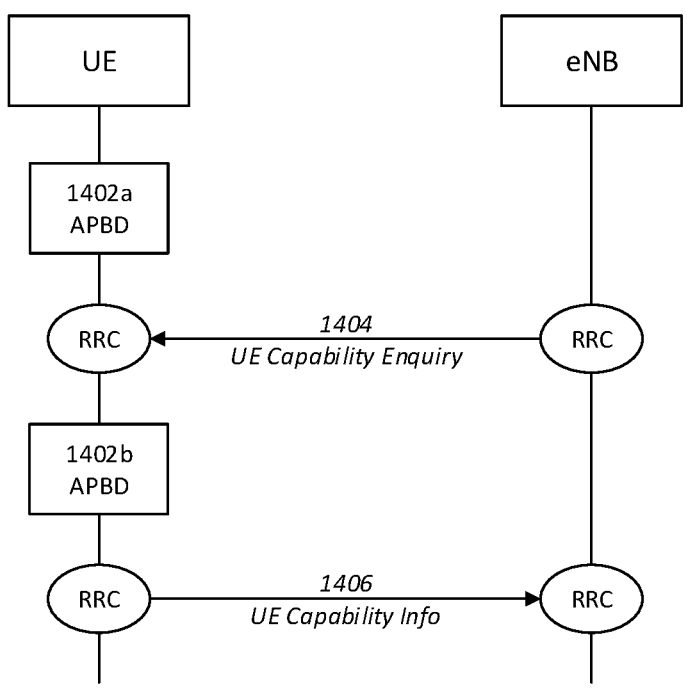
FIG. 14 is a message sequence chart (MSC) showing an exemplary scenario in an aspect of this disclosure.

FIG. 14 is a message sequence chart (MSC) 1400 showing a scenario during which the APBD method of this disclosure are applied. It appreciated that MSC 1400 is exemplary in nature and may be simplified for purposes of this explanation.

MSC 1400 shows an exchange of RRC signaling between a UE and an eNB known as the UE Capability Transfer. The serving eNB enquires the UE about its radio access capabilities in the UE Capability Enquiry 1404. Before responding, the UE forms its response based on the priority band list according to the APBD methods of this disclosure 1404b. In an aspect of the disclosure, the UE may perform the acquisition of the priority bands 1402a in anticipation of receiving the enquiry from the eNB 1404. In either case, the UE transmits the UE Capability Information 1406 back to the eNB based on the priority band list assembled by the APBD methods.

Figure 15:
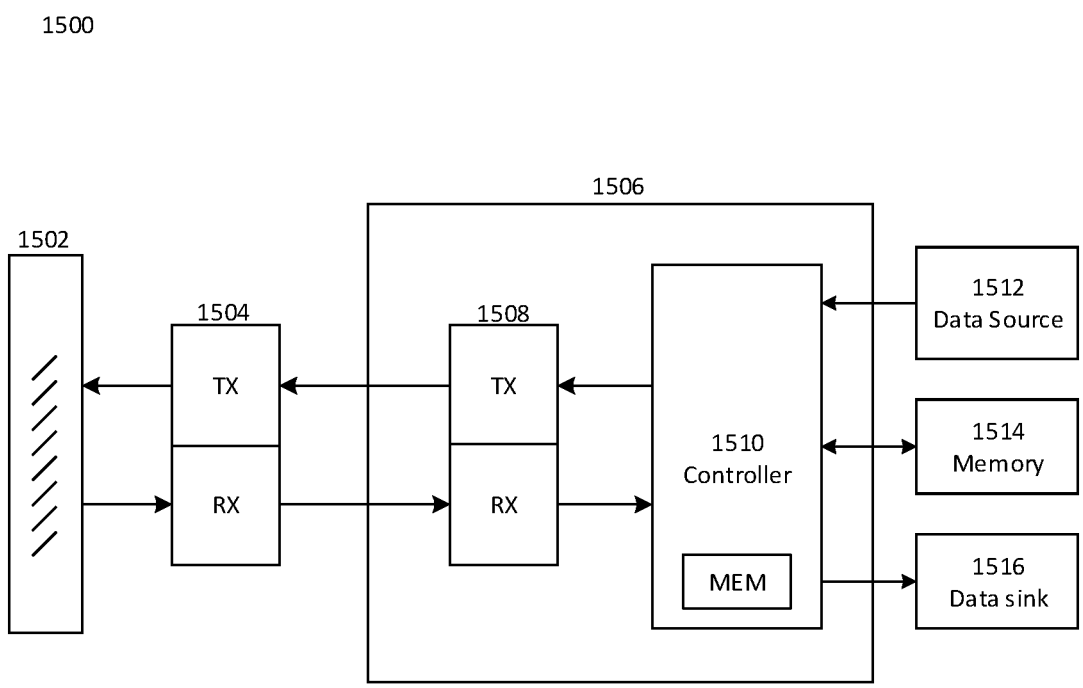
FIG. 15 shows a configuration of a device configured to perform the methods and algorithms of this disclosure.

FIG. 15 shows an internal configuration of a UE 1500, which may be configured to perform the APBD of this disclosure. As shown in FIG. 15, UE 1500 may include antenna system 1502, radio frequency (RF) transceiver 1504, baseband modem 1506 (including physical layer processing circuit 1508 and controller 1510), data source 1512, memory 1514, and data sink 1516. Although not explicitly shown in FIG. 15, UE 1500 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 1500 may transmit and receive radio signals on one or more radio access network (RANs), e.g. an LTE RAN. Baseband modem 1506 may direct such communication functionality of UE 1500 according to the communication protocols associated with each RAN, and may execute control over antenna system 1502 and RF transceiver 1504 in order to transmit and receive radio signals according to the formatting and scheduling parameters defined by each communication protocol.

UE 1500 may transmit and receive radio signals with antenna system 1502, which may be a single antenna or an antenna array composed of multiple antennas and may additionally include analog antenna combination and/or beamforming circuitry. The receive path (RX) of RF transceiver 1504 may receive analog radio frequency signals from antenna system 1502 and perform analog and digital RF front-end processing on the analog radio frequency signals to produce digital baseband samples (e.g. In-Phase/Quadrature (IQ) samples) to provide to baseband modem 1506. RF transceiver 1504 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 1504 may receive digital baseband samples from baseband modem 1506 and perform analog and digital RF front-end processing on the digital baseband samples to produce analog radio frequency signals to provide to antenna system 1502 for wireless transmission. RF transceiver 1504 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 1506 to produce the analog radio frequency signals for wireless transmission by antenna system 1502. Baseband modem 1506 may control the RF transmission and reception of RF transceiver 1504, including specifying transmit and receive radio frequencies for operation of RF transceiver 1504.

As shown in FIG. 15, baseband modem 1506 may include physical layer processing circuit 1508, which may perform physical layer (i.e. Layer 1) transmission and reception processing to prepare outgoing transmit data provided by controller 1510 for transmission via RF transceiver 1504 and prepare incoming received data provided by RF transceiver 1504 for processing by controller 1510. Physical layer processing circuit 1510 may accordingly perform one or more of channel estimation, adaptive filtering, error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 1508 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 15, physical layer processing circuit 1508 may include a control circuit such as a processor configured to control the various hardware and software processing components of physical layer processing circuit 1508 in accordance with physical layer control logic defined by the communications protocol for the relevant radio access technologies (RATs). Furthermore, while physical layer processing circuit 1508 is depicted as a single component in FIG. 15, physical layer processing circuit 1508 may be collectively composed separate sections of physical layer processing circuitry where each respective section is dedicated to the physical layer processing of a particular RAT.

Physical layer processing circuit 1508 may include hardware and/or software to implement the APBD methods of this disclosure.

UE 1500 may be configured to operate according to one or more RATs, which may be directed by controller 1510. Controller 1510 may thus be responsible for controlling the radio communication components of UE 1500 (antenna system 1502, RF transceiver 1504, and physical layer processing circuit 1508) in accordance with the communication protocols of each supported RAT, and accordingly may represent the Access Stratum (AS) and Non-Access Stratum (NAS) (also encompassing Layer 2 and Layer 3) of each supported RAT. Controller 1510 may be structurally embodied as a protocol processor configured to execute protocol software (retrieved from controller memory MEM as shown in FIG. 15), e.g. hardware and/or software to implement the APBD methods of this disclosure, and subsequently control the radio communication components of UE 1500 in order to transmit and receive communication signals in accordance with the corresponding protocol control logic defined in the protocol software.

Controller 1510 may therefore be configured to manage the radio communication functionality of UE 1500 in order to communicate with the various radio and core network components of a radio communication network, and accordingly may be configured according to the communication protocols for both the LTE network and the GSM/UMTS legacy network. Controller 1510 may either be a unified controller that is collectively responsible for all supported RATs (e.g. LTE and GSM/UMTS) or may be composed of multiple separate controllers where each controller is a dedicated controller for a particular RAT, such as e.g. a dedicated LTE controller and a dedicated legacy controller (or alternatively a dedicated LTE controller, dedicated GSM controller, and a dedicated UMTS controller). Regardless, controller 1510 may be responsible for directing radio communication activity of UE 1500 according to the communication protocols of the LTE and legacy networks. As previously noted regarding physical layer processing circuit 1508, one or both of antenna system 1502 and RF transceiver 1504 may similarly be partitioned into multiple dedicated components that each respectively correspond to one or more of the supported RATs. Depending on the specifics of each such configuration and the number of supported RATs, controller 1510 may be configured to control the radio communication operations of UE 1500 in accordance with a master/slave RAT hierarchical or multi-SIM scheme.

UE 1500 may further comprise data source 1512, memory 1514, and data sink 1516, where data source 1512 may include sources of communication data above controller 1510 (i.e. above the NAS/Layer 3) and data sink 1516 may include destinations of communication data above controller 1510 (i.e. above the NAS/Layer 3). Such may include, for example, an application processor of UE 1500, which may be configured to execute various applications and/or programs of UE 1500 at an application layer of UE 1500, such as e.g. an Operating System (OS), a User Interface (UI) for supporting user interaction with UE 1500, and/or various user applications. The application processor may interface with baseband modem 1506 (as data source 1512/data sink 1516) as an application layer to transmit and receive user data such as voice data, audio/video/image data, messaging data, application data, basic Internet/web access data, etc., over a the radio network connection(s) provided by baseband modem 1506. Data source 1512 and data sink 1516 may additionally represent various user input/output devices of UE 1500, such as display(s), keypad(s), touchscreen(s), speaker(s), external button(s), camera(s), microphone(s), etc., which may allow a user of UE 1500 to control various communication functions of UE 1500 associated with user data.

Memory 1514 may include a memory component of UE 1500, such as e.g. a hard drive or another such permanent memory device. Although not explicitly depicted in FIG. 15, the various other components of UE 1500 shown in FIG. 15 may additionally each include integrated permanent and non-permanent memory components, such as for storing software program code, buffering data, etc.

FIG. 16 shows a flowchart 1600 describing a process by which to report frequency bands supported by a communication device to a network. It is appreciated that flowchart 1600 is exemplary in nature and may be simplified for purposes of this explanation.

In 1602, the communication device acquires an information from the network. This acquisition may include receiving SIBs, e.g. SIB 1, 5, and/or 19 broadcast from the network. In 1604, the communication device may assemble a database, the database including a plurality of frequency bands derived from the information acquired from the network.

In 1606, the communication device creates a priority frequency band list using an extraction parameter, wherein the priority frequency band list consists of one or more frequency bands from the plurality of frequency bands in the database. The communication device may be configured to perform 1606 in simultaneously with 1604. The extraction parameter may include a reduction parameter and/or a priority parameter. The communication device may be configured to implement these parameters to avoid duplicate frequency bands in the priority frequency band list and/or promote frequency band to a higher priority in (i.e. move up) the priority frequency band list. A frequency band may by subject to both parameters, for example, in the case where the frequency band is already on the list, the duplicate frequency band may be eliminated, but the frequency band already on the list may be promoted to a higher priority. Furthermore, the extraction parameter may include limiting parameter which limits the number of frequency bands to be reported to the network to a certain value. This value may be a number and/or a data size based on the length of the report to be uplinked to the network (e.g. based on the length of "UE Capability Info") in order to ensure that the highest priority supported frequency bands are reported to the network.

In 1608, the communication device reports the priority frequency band list to the network. For example, the communication device may report the priority frequency band list in response to a trigger, such a network request.

In Example 1, a method for a communication device to determine one or more supported frequency bands to report to a network, the method including: acquiring an information from the network; assembling a database, the database comprising a plurality of frequency bands derived from the information acquired from the network; creating a priority frequency band list using an extraction parameter, wherein the priority frequency band list consists of one or more frequency bands from the plurality of frequency bands in the database; and reporting the priority frequency band list to the network.

In Example 2, the subject matter of Example 1 may include wherein the extraction parameter comprises a reduction parameter.

In Example 3, the subject matter of Example 2 may include wherein the reduction parameter is configured to eliminate a repetition of frequency bands in the priority frequency band list.

In Example 4, the subject matter of Examples 1-3 may include wherein the extraction parameter comprises a priority parameter.

In Example 5, the subject matter of Example 4 may include wherein the priority parameter is configured to re-prioritize frequency bands in the priority frequency band list.

In Example 6, the subject matter of Examples 1-5 may include: receiving a measurement configuration for a respective frequency from the network; mapping the respective frequency to a respective frequency band; determining whether the respective frequency band is supported by the communication device; and determining whether the respective frequency band is in the database.

In Example 7, the subject matter of Example 6 may include wherein when the respective frequency band is not in the database, further comprising adding the frequency band to the database, or, wherein when the respective frequency band is in the database, discarding the respective frequency.

In Example 8, the subject matter of Examples 1-7 may include triggering the reporting to the network in response to a network request.

In Example 9, the subject matter of Example 8 may include wherein the network request comprises a user equipment (UE) Capability Enquiry.

In Example 10, the subject matter of Example 9 may include transmitting a UE Capability Information in response to the UE Capability Enquiry, wherein the UE Capability Information includes the priority frequency band list.

In Example 11, the subject matter of Example 10 may include wherein the UE Capability Information comprises E-UTRAN information.

In Example 12, the subject matter of Example 8 may include wherein the network request comprises a Radio Resource Control (RRC) Connection Setup message.

In Example 13, the subject matter of Example 12 may include transmitting a RRC Connection Setup Complete message in response to the RRC Connection Setup message, wherein the RRC Connection Setup Complete message comprises the priority frequency band list.

In Example 14, the subject matter of Examples 1-13 may include wherein the information broadcast from the network comprises information from at least one of a System Information Block (SIB) 1 or an SIB 5.

In Example 15, the subject matter of Example 14 may include obtaining one or more frequencies from a freqBandIndicator component of SIB 1.

In Example 16, the subject matter of Example 15 may include determining whether the one or more frequencies are supported by the communication device.

In Example 17, the subject matter of Example 16 may include adding the one or more frequencies to the database of priority frequencies.

In Example 18, the subject matter of Examples 14-17 may include obtaining at least one additional frequency from a multiBandList component of SIB 1.

In Example 19, the subject matter of Example 18 may include determining whether the at least one additional frequency is supported by the communication device.

In Example 20, the subject matter of Example 19 may include determining whether the at least one additional frequency is in the database of priority frequencies.

In Example 21, the subject matter of Example 20 may include adding the at least one additional frequency to the database of priority frequencies.

In Example 22, the subject matter of Examples 1-21 may include obtaining a second set of frequencies from an SIB 5 component, wherein the second set comprises one or more frequencies.

In Example 23, the subject matter of Example 22 may include wherein the SIB 5 component comprises an interFreqCarrierFreqList.

In Example 24, the subject matter of Example 23 may include obtaining an Evolved Absolute Radio Frequency Channel Number (EARFCN).

In Example 25, the subject matter of Example 24 may include mapping the EARFCN to a respective band.

In Example 26, the subject matter of Example 25 may include determining whether the respective band is supported by the communication device.

In Example 27, the subject matter of Example 26 may include determining whether the respective band is in the database of priority frequencies.

In Example 28, the subject matter of Example 27 may include adding the respective band to the database of priority frequencies.

In Example 29, the subject matter of Example 22-28 may include obtaining at least one further frequency from a multiBandList component of SIB 5.

In Example 30, the subject matter of Example 29 may include determining whether the at least one further frequency is supported by the communication device.

In Example 31, the subject matter of Example 30 may include determining whether the at least one further frequency is in the database of priority frequencies.

In Example 32, the subject matter of Example 31 may include adding the at least one further frequency to the database of priority frequencies.

In Example 33, the subject matter of Examples 1-32 may include obtaining one or more supplemental frequencies from an additional source. The additional source may be, for example, from a memory component in the communication device or from a source readily accessible by the communication device.

In Example 34, the subject matter of Example 33 may include mapping the one or more supplemental frequencies to its respective supplemental band.

In Example 35, the subject matter of Example 34 may include determining whether the communication device supports the respective supplemental band.

In Example 36, the subject matter of Example 35 may include determining whether the respective supplemental band is in the database of priority frequencies.

In Example 37, the subject matter of Example 36 may include adding the respective supplemental band to the database of priority frequencies.

In Example 38, the subject matter of Example 35 may include wherein when the respective supplemental band is in the database of priority frequencies, moving the respective supplemental band to the head of the list of priority frequencies.

In Example 39, the subject matter of Examples 1-38 may include obtaining one or more ancillary frequencies from an SIB 19.

In Example 40, the subject matter of Examples 1-39 may include the creating of the priority frequency band list based on the database comprising setting a content of the one or more uplinks to only include frequency bands from the database.

In Example 41, the subject matter of Example 40 may include setting the content of a "supportedBandListEUTRA" in the one or more uplinks to only include frequency bands from the database.

In Example 42, the subject matter of Examples 40-41 may include setting a content of a "bandListEUTRA" in the one or more uplinks to only include frequency bands from the database.

In Example 43, the subject matter of Examples 40-42 may include setting a content of a "supportedBandCombination" in the one or more uplinks to only include frequency bands from the database.

In Example 44, the subject matter of Examples 1-43 may include wherein the database comprises at least one frequency stored on a memory component of the communication device.

In Example 45, the subject matter of Example 44 may include wherein the at least one frequency stored on the memory component of the communication device is selected from the group consisting of a Multimedia Broadcast Multicast Service (MBMS) and a Closed Subscriber Group (CSG) cell.

In Example 46, a signal processing circuitry for determining one or more supported frequencies for a communication device to report to a network, the signal processing circuitry configured to: acquire an information from the network; assemble a database of priority frequencies, the database comprising a plurality of frequency bands derived from the information acquired from the network; create a priority frequency band list using an extraction parameter, wherein the priority frequency band list consists of one or more frequency bands from the plurality of frequency bands in the database; and report the priority frequency band list to the network.

In Example 47, the subject matter of Example 46 may include wherein the extraction parameter comprises a reduction parameter.

In Example 48, the subject matter of Example 47 may include wherein the reduction parameter is configured to eliminate a repetition of frequency bands in the priority frequency band list.

In Example 49, the subject matter of Examples 46-48 may include wherein the extraction parameter comprises a priority parameter.

In Example 50, the subject matter of Example 49 may include wherein the priority parameter is configured to re-prioritize frequency bands in the priority frequency band list.

In Example 51, the subject matter of Examples 46-50 may include the signal processing circuitry further configured to: receive a measurement configuration for a frequency from the network; map the frequency to a frequency band; determine whether the frequency band is supported by the communication device; and determine whether the frequency band is present in the database.

In Example 52, the subject matter of Example 51 may include wherein when the respective frequency band is not in the database, the signal processing circuitry further configured to add the frequency band to the database, or, wherein when the respective frequency band is in the database, the signal processing circuitry further configured to discard the respective frequency.

In Example 53, the subject matter of Examples 46-52 may include the signal processing circuitry further configured to trigger the reporting to the network in response to a network request.

In Example 54, the subject matter of Example 53 may include wherein the network request comprises a user equipment (UE) Capability Enquiry.

In Example 55, the subject matter of Example 54 may include the signal processing circuitry further configured to transmit a UE Capability Information in response to the UE Capability Enquiry, wherein the UE Capability Information includes the priority frequency band list.

In Example 56, the subject matter of Example 55 may include wherein the UE Capability Information comprises E-UTRAN information.

In Example 57, the subject matter of Example 53 may include wherein the network request comprises a Radio Resource Control (RRC) Connection Setup message.

In Example 58, the subject matter of Example 57 may include the signal processing circuitry further configured to transmit a RRC Connection Setup Complete message in response to the RRC Connection Setup message, wherein the RRC Connection Setup Complete message comprises the priority frequency band list.

In Example 59, the subject matter of Examples 46-58 may include wherein the information broadcast from the network comprises information from at least one of a System Information Block (SIB) 1 or an SIB 5.

In Example 60, the subject matter of Example 59 may include the signal processing circuitry further configured to obtain one or more frequencies from a freqBandIndicator component of SIB 1.

In Example 61, the subject matter of Example 60 may include the signal processing circuitry further configured to determine whether the one or more frequencies are supported by the communication device.

In Example 62, the subject matter of Example 61 may include the signal processing circuitry further configured to add the one or more frequencies to the database of priority frequencies.

In Example 63, the subject matter of Examples 59-62 may include the signal processing circuitry further configured to obtain at least one additional frequency from a multiBandList component of SIB 1.

In Example 64, the subject matter of Example 63 may include the signal processing circuitry further configured to determine whether the at least one additional frequency is supported by the communication device.

In Example 65, the subject matter of Example 64 may include the signal processing circuitry further configured to determine whether the at least one additional frequency is in the database of priority frequencies.

In Example 66, the subject matter of Example 65 may include the signal processing circuitry further configured to add the at least one additional frequency to the database of priority frequencies.

In Example 67, the subject matter of Examples 46-66 may include the signal processing circuitry further configured to obtain a second set of frequencies from an SIB 5 component, wherein the second set comprises one or more frequencies.

In Example 68, the subject matter of Example 67 may include wherein the SIB 5 component comprises an interFreqCarrierFreqList.

In Example 69, the subject matter of Example 68 may include the signal processing circuitry further configured to obtain an Evolved Absolute Radio Frequency Channel Number (EARFCN).

In Example 70, the subject matter of Example 69 may include the signal processing circuitry further configured to map the EARFCN to a respective band.

In Example 71, the subject matter of Example 70 may include the signal processing circuitry further configured to determine whether the respective band is supported by the communication device.

In Example 72, the subject matter of Example 71 may include the signal processing circuitry further configured to determine whether the respective band is in the database of priority frequencies.

In Example 73, the subject matter of Example 72 may include the signal processing circuitry further configured to add the respective band to the database of priority frequencies.

In Example 74, the subject matter of Examples 67-73 may include the signal processing circuitry further configured to obtain at least one further frequency from a multiBandList component of SIB 5.

In Example 75, the subject matter of Example 74 may include the signal processing circuitry further configured to determine whether the at least one further frequency is supported by the communication device.

In Example 76, the subject matter of Example 75 may include the signal processing circuitry further configured to determine whether the at least one further frequency is in the database of priority frequencies.

In Example 77, the subject matter of Example 76 may include the signal processing circuitry further configured to add the at least one further frequency to the database of priority frequencies.

In Example 78, the subject matter of Examples 46-77 may include the signal processing circuitry further configured to obtain one or more supplemental frequencies from an additional source. The additional source may be, for example, from a memory component in the communication device or from a source readily accessible by the communication device.

In Example 79, the subject matter of Example 78 may include the signal processing circuitry further configured to map the one or more supplemental frequencies to its respective supplemental band.

In Example 80, the subject matter of Example 79 may include the signal processing circuitry further configured to determine whether the communication device supports the respective supplemental band.

In Example 81, the subject matter of Example 80 may include the signal processing circuitry further configured to determine whether the respective supplemental band is in the database of priority frequencies.

In Example 82, the subject matter of Example 81 may include the signal processing circuitry further configured to add the respective supplemental band to the database of priority frequencies.

In Example 83, the subject matter of Example 82 may include wherein when the respective supplemental band is in the database of priority frequencies, the circuitry further configured to move the respective supplemental band to the head of the list of priority frequencies.

In Example 84, the subject matter of Examples 46-83 may include the signal processing circuitry further configured to obtain one or more ancillary frequencies from an SIB 19.

In Example 85, the subject matter of Examples 46-84 may include the signal processing circuitry further configured to create the priority frequency band list based on the database by setting a content of the one or more uplinks to only include frequency bands from the database.

In Example 86, the subject matter of Example 85 may include the signal processing circuitry further configured to set the content of a "supportedBandListEUTRA" in the one or more uplinks to only include frequency bands from the database.

In Example 87, the subject matter of Examples 85-86 may include the signal processing circuitry further configured to set a content of a "bandListEUTRA" in the one or more uplinks to only include frequency bands from the database.

In Example 88, the subject matter of Examples 85-87 may include the signal processing circuitry further configured to set a content of a "supportedBandCombination" in the one or more uplinks to only include frequency bands from the database.

In Example 89, the subject matter of Examples 46-88 may include the database comprising at least one frequency stored on a memory component accessible to the signal processing circuitry.

In Example 90, the subject matter of Example 89 may include wherein the at least one frequency stored on the memory component accessible to the signal processing circuitry is selected from the group consisting of a Multimedia Broadcast Multicast Service (MBMS) and a Closed Subscriber Group (CSG) cell.

In Example 91, the subject matter of Examples 46-90 may include the signal processing circuitry operatively coupled to a transceiver of a communication device, the transceiver configured to communicate with the network.

In Example 92, a communication device configured to determine one or more supported frequencies to report to a network, the communication device comprising: a transceiver configured to communicate with the network; a baseband unit operatively coupled to the transceiver and configured to: acquire an information from the network via the transceiver; assemble a database, the database comprising a plurality of frequency bands derived from the information acquired from the network or at least one frequency stored on a memory component of the communication device; create a priority frequency band list using an extraction parameter, wherein the priority frequency band list consists of one or more frequency bands from the plurality of frequency bands in the database; and report the priority frequency band list to the network via the transceiver; and a memory configured to store the database.

In Example 93, the subject matter of Example 92 may include wherein the extraction parameter comprises a reduction parameter.

In Example 94, the subject matter of Example 93 may include wherein the reduction parameter is configured to eliminate a repetition of frequency bands in the priority frequency band list.

In Example 95, the subject matter of Examples 92-94 may include wherein the extraction parameter comprises a priority parameter.

In Example 96, the subject matter of Example 95 may include wherein the priority parameter is configured to re-prioritize frequency bands in the priority frequency band list.

In Example 97, the subject matter of Examples 92-96 may include the baseband unit further configured to: receive a measurement configuration for a frequency from the network; map the frequency to a frequency band; determine whether the frequency band is supported by the communication device; and determine whether the frequency band is present in the database.

In Example 98, the subject matter of Example 97 may include wherein when the respective frequency band is not in the database, the baseband unit further configured to add the frequency band to the database, or, wherein when the respective frequency band is in the database, the baseband unit further configured to discard the respective frequency.

In Example 99, a communication device with a signal processing component configured to implement the method of any one of Examples 1-45.

In Example 100, a computer readable medium including program instructions, which when executed by a processor of a device, cause the device to implement the method of any one of Examples 1-45.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device for determining one or more supported frequencies of a communication device to report to a network, the communication device comprising one or more processors configured to:
   acquire an information from the network;
   assemble a database of priority frequencies, the database comprising a plurality of frequency bands derived from the information acquired from the network;
   create a priority frequency band list using an extraction parameter, wherein the priority frequency band list comprises one or more frequency bands from the plurality of frequency bands in the database, and wherein the extraction parameter comprises a reduction parameter to eliminate a repetition of frequency bands in the priority frequency band list; and
   report the priority frequency band list to the network.

2. The communication device of claim 1, wherein the extraction parameter comprises a priority parameter to re-prioritize frequency bands in the priority frequency band list.

3. The communication device of claim 1, the one or more processors further configured to:
   receive a measurement configuration for a frequency from the network;
   map the frequency to a frequency band;
   determine whether the frequency band is supported by the communication device; and
   determine whether the frequency band is present in the database.

4. The communication device of claim 3, wherein when the respective frequency band is not in the database, the one or more processors further configured to add the frequency band to the database, or, wherein when the respective frequency band is in the database, the one or more processors further configured to discard the respective frequency.

5. The communication device of claim 1, the one or more processors further configured to trigger the reporting to the network in response to a network request.

6. The communication device of claim 5, the one or more processors further configured to transmit a UE Capability Information in response to the network request, wherein the UE Capability Information includes the priority frequency band list.

7. The communication device of claim 1, the one or more processors further configured to obtain one or more frequencies from a freqBandIndicator component of System Information Block (SIB)1.

8. The communication device of claim 7, the one or more processors further configured to obtain a second set of frequencies from an SIB 5 component, wherein the second set comprises one or more frequencies.

9. The communication device of claim 1, the one or more processors further configured to obtain one or more supplemental frequencies from an additional source to include in the database.

10. The communication device of claim 9, wherein the additional source is a memory component of the communication device, and at least one of the one or more supplemental frequencies is selected from the group consisting of a Multimedia Broadcast Multicast Service (MBMS) and a Closed Subscriber Group (CSG) cell.

11. The communication device of claim 9, the one or more processors further configured to determine whether a respective supplemental frequency band of each of the one or more supplemental frequencies is in the database of priority frequencies, wherein when the respective supplemental band is in the database of priority frequencies, the one or more processors further configured to move the respective supplemental band to the head of the priority frequency band list.

12. The communication device of claim 1, the one or more processors further configured to create the priority frequency band list by setting a content of one or more uplink communications to only include frequency bands from the assembled database.

13. The communication device of claim 1, wherein a frequency band already on the priority frequency band list is promoted to a higher priority based on the reduction parameter eliminating a repetition of the frequency band already on the priority frequency band list.

14. A method for a communication device to determine one or more supported frequency bands to report to a network, the method comprising:
acquiring an information from the network;
assembling a database, the database comprising a plurality of frequency bands derived from the information acquired from the network;
creating a priority frequency band list using an extraction parameter, wherein the priority frequency band list comprises one or more frequency bands from the plurality of frequency bands in the database, wherein the extraction parameter comprises a reduction parameter to eliminate a repetition of frequency bands in the priority frequency band list; and
reporting the priority frequency band list to the network.

15. The method of claim 13, wherein the extraction parameter comprises a priority parameter to re-prioritize frequency bands in the priority frequency band list.

16. The method of claim 13, further comprising:
receiving a measurement configuration for a respective frequency from the network;
mapping the respective frequency to a respective frequency band;
determining whether the respective frequency band is supported by the communication device; and
determining whether the respective frequency band is in the database.

17. The method of claim 14, wherein a frequency band already on the priority frequency band list is promoted to a higher priority based on the reduction parameter eliminating a repetition of the frequency band already on the priority frequency band list.

18. One or more non-transitory computer readable media including program instructions, which when executed by a processor of a device, cause the device to:
acquire an information from the network;
assemble a database, the database comprising a plurality of frequency bands derived from the information acquired from the network;
create a priority frequency band list using an extraction parameter, wherein the priority frequency band list comprises one or more frequency bands from the plurality of frequency bands in the database, and wherein the extraction parameter comprises a reduction parameter to eliminate a repetition of frequency bands in the priority frequency band list; and
report the priority frequency band list to the network.

19. The one or more non-transitory computer readable media of claim 18, wherein the extraction parameter comprises a priority parameter to re-prioritize frequency bands in the priority frequency band list.

20. The one or more non-transitory computer readable media of claim 18, wherein a frequency band already on the priority frequency band list is promoted to a higher priority based on the reduction parameter eliminating a repetition of the frequency band already on the priority frequency band list.

* * * * *